US010197281B2

(12) United States Patent
Dolmansley et al.

(10) Patent No.: US 10,197,281 B2
(45) Date of Patent: Feb. 5, 2019

(54) SUPPLEMENTARY LASER FIRING FOR COMBUSTION STABILITY

(71) Applicant: Siemens Aktiengesellschaft, Munich (DE)

(72) Inventors: Timothy Dolmansley, Worksop (GB); Jonathan May, Lincoln (GB); Herman Ruijsenaars, Lincoln (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 443 days.

(21) Appl. No.: 14/767,484

(22) PCT Filed: Jan. 23, 2014

(86) PCT No.: PCT/EP2014/051292
§ 371 (c)(1),
(2) Date: Aug. 12, 2015

(87) PCT Pub. No.: WO2014/131559
PCT Pub. Date: Sep. 4, 2014

(65) Prior Publication Data
US 2015/0377490 A1 Dec. 31, 2015

(30) Foreign Application Priority Data
Feb. 27, 2013 (EP) ..................................... 13156945

(51) Int. Cl.
F23R 3/28 (2006.01)
F02C 7/264 (2006.01)
F23R 3/34 (2006.01)

(52) U.S. Cl.
CPC .............. F23R 3/286 (2013.01); F02C 7/264 (2013.01); F23R 3/343 (2013.01); F23C 2900/07001 (2013.01); F23R 2900/00006 (2013.01)

(58) Field of Classification Search
CPC ...................... F23R 3/286; F23R 3/343; F23R 2900/00006; F23C 2900/07001; F02C 7/264
See application file for complete search history.

(56) References Cited

U.S. PATENT DOCUMENTS 4,035,131 A 7/1977 Cerkanowicz
4,052,139 A 10/1977 Paillaud et al.
(Continued)

FOREIGN PATENT DOCUMENTS

EP 1870581 A1 12/2007
JP S555125 A 1/1980
(Continued)

OTHER PUBLICATIONS

RU Official Decision of grant dated Nov. 29, 2016, for RU patent application No. 2015136210.
(Continued)

Primary Examiner — Ted Kim
(74) Attorney, Agent, or Firm — Brusse Wolter Sanks & Maire

(57) ABSTRACT

A combustion system for a gas turbine includes a combustion chamber having an end section and a pre-combustion section extending from the end section, a swirler device, an optional pilot burner device and a light emitting arrangement. Main fuel is injectable by the swirler device into an inner volume of the pre-combustion section. The main flame using main fuel is producible inside the inner volume. The pilot burner device is mounted to the end section of the combustion chamber such that a pilot fuel is injectable by
(Continued)

the pilot burner device into the inner volume of the pre-combustion section, wherein a pilot flame using the pilot fuel is producible inside the inner volume for stabilizing the main flame. The light emitting arrangement emits an electromagnetic radiation into the inner volume, such that an energy input is generatable by the electromagnetic radiation for stabilizing the pilot flame and/or the main flame.

20 Claims, 2 Drawing Sheets

(56) References Cited

U.S. PATENT DOCUMENTS

| | | | |
|---|---|---|---|
| 4,230,448 A | | 10/1980 | Ward et al. |
| 4,556,020 A | | 12/1985 | Hickling |
| 5,367,869 A | * | 11/1994 | DeFreitas ............... F02C 7/264 |
| | | | 60/39.821 |
| 5,515,681 A | * | 5/1996 | DeFreitas ............... F23D 11/32 |
| | | | 60/39.821 |
| 5,542,247 A | | 8/1996 | Bushman |
| 5,640,841 A | | 6/1997 | Crosby |
| 5,845,480 A | * | 12/1998 | DeFreitas ............... F02C 7/264 |
| | | | 123/536 |
| 6,151,899 A | * | 11/2000 | Park ........................ F23C 7/004 |
| | | | 60/737 |
| 6,302,682 B1 | * | 10/2001 | Early ....................... F02P 23/04 |
| | | | 431/1 |
| 6,385,963 B1 | | 5/2002 | Hunt et al. |
| 6,453,660 B1 | | 9/2002 | Johnson |
| 6,532,726 B2 | * | 3/2003 | Norster ................... F23C 7/002 |
| | | | 60/39.281 |
| 7,080,504 B2 | | 7/2006 | Pais |
| 7,412,129 B2 | * | 8/2008 | Yalin ....................... F02D 35/022 |
| | | | 385/31 |
| 2002/0092302 A1 | | 7/2002 | Johnson et al. |
| 2006/0016169 A1 | | 1/2006 | Pais |
| 2010/0126176 A1 | * | 5/2010 | Kim ........................ F23C 7/006 |
| | | | 60/748 |
| 2011/0214409 A1 | | 9/2011 | Gabl et al. |
| 2012/0131926 A1 | * | 5/2012 | Kopecek ................. F02C 7/264 |
| | | | 60/776 |

FOREIGN PATENT DOCUMENTS

| | | |
|---|---|---|
| JP | 2002322917 A | 11/2002 |
| JP | 2005180799 A | 7/2005 |
| JP | 2006258041 A | 9/2006 |
| RU | 2151898 C1 | 6/2000 |

OTHER PUBLICATIONS

JP Office Action dated Aug. 1, 2016, for JP application No. 2015-559446.

* cited by examiner

SUPPLEMENTARY LASER FIRING FOR COMBUSTION STABILITY

CROSS REFERENCE TO RELATED APPLICATIONS

This application is the U.S. National Stage of International Application No. PCT/EP2014/051292 filed Jan. 23, 2014, and claims the benefit thereof. The International Application claims the benefit of European Application No. EP13156945 filed Feb. 27, 2013. All of the applications are incorporated by reference herein in their entirety.

FIELD OF INVENTION

The present invention relates to a combustion system for a gas turbine and to a method for controlling a combustion system for a gas turbine.

BACKGROUND OF INVENTION

In combustion chambers for gas turbines, it is an aim to reduce the emissions, such as nitrogen oxides NOx and/or carbon monoxide CO. The temperatures inside the combustion chamber cause high CO and NOx emissions.

In order to reduce the emissions, so-called dry low emissions (DLE) combustion systems are used which typically have a supplementary fuel stream which burns in a diffusion flame mode. The supplementary fuel stream may generate a so-called pilot flame. This stabilizes a main flame in the combustion chamber. In order to reduce the emissions, the pilot flame has to be limited.

Moreover, it is an aim to reduce the temperatures in the combustion chamber in order to decrease the NOx emissions. These lower temperatures may be achieved by burning a lean fuel air mixture in the main flame. A lean fuel air mixture comprises more air than is required to fully burn all the fuel. The lean fuel air mixture therefore comprises a lower flame temperature. However, lean flames can be very unstable and only small changes in the equivalence ratio (the ratio of the fuel/air mix to the fuel/air mix required for all the oxygen and all of the fuel to be completely used in combustion, known as stoichiometric mix) can cause a flameout.

The dry low emission combustion systems comprise a main flame where a very lean fuel mixture is burned. Under normal circumstances this would cause an unstable flame which is prone to dynamics. Therefore, the DLE systems use the pilot flame. A pilot flame comprises a rich or richer fuel mixture, wherein the rich or richer pilot flame is more stable than the lean main flame and the heat and radicals produced from this hot stable pilot frame stabilizes the main flame.

However, the pilot flame is locally hot and therefore causes high NOx emissions.

In order to stabilize the main flame in a combustion chamber, further energy sources may be used to stabilize the main flame.

US 2006/0016169 A discloses a turbojet propulsion system. A laser system comprises laser arrays for providing electromagnetic radiation to the combustion section of a combustion chamber so that the combustion process is augmented.

U.S. Pat. No. 4,035,131 discloses a combustion chamber which comprises controlling means for controlling an ignition of a self-sustaining combustion in fuel/oxidizer mixtures through the use of ultraviolet radiation absorbed throughout the fuel/oxidizer mixture.

U.S. Pat. No. 4,556,020 discloses an arrangement for stimulating a combustion in particular of lean mixtures in internal combustion engines. A photon energy source is fed to the flame by applying an ultraviolet light source.

US 2011/0214409 A1 discloses a combustion turbine comprising a combustion chamber. Each combustion chamber is provided with an ignition device for igniting a fuel/air mixture. The ignition device may comprise a laser ignition system.

U.S. Pat. No. 5,640,841 discloses a plasma torch ignition for low NOx combustion turbines. Plasma-heated fuel is injected for precisely controlling a light-off a lean mixture in the combustion basket while minimizing the NOx production through elimination of the air required by the pilot flame of conventional turbine combustors.

U.S. Pat. No. 4,052,139 discloses an apparatus for improving an energy yield of a reaction. An electromagnetic radiation simulates molecules of a reactance, such as a fuel/oxygen mixture in a combustion chamber.

U.S. Pat. No. 4,230,448 discloses an oil burner with a combustion chamber having a microwave energy source. The microwave energy source is connected to a fuel supply line to heat the fuel and to apply an electric field at a nozzle of a fuel spray in the area of combustion in the combustion chamber.

SUMMARY OF THE INVENTION

It may be an objective of the present invention to provide a combustion chamber with a stable flame characteristic.

This objective is solved by a combustion system for a gas turbine and by a method for controlling a combustion system for a gas turbine according to the independent claims.

According to a first aspect of the present invention, a combustion system for a gas turbine is presented. The combustion system comprises a combustion chamber, a swirler device, an optional pilot burner device and a light emitting arrangement.

The combustion chamber has an end section and a pre-combustion section extending from the end section along a centre axis of the combustion chamber.

The swirler device is mounted to the pre-combustion section, wherein a main fuel is injectable by or through the swirler into an inner volume of the pre-combustion section such that a main flame using the main fuel is producible inside the inner volume.

The combustion system optionally comprises a pilot burner device. The invention may allow that the pilot burner device becomes superfluous compared to the prior art solutions. On the other hand in other configurations it may be beneficial to additionally have the pilot burner device in the combustion system. The pilot burner device—if present—is mounted to the end section of the combustion chamber, whereby a pilot fuel is injectable by or through the pilot burner device into the inner volume of the pre-combustion section such that the pilot flame using the pilot fuel is producible inside the inner volume for stabilizing the main flame.

"Optional" in the sense of this application means that the "optional pilot burner" may be present and operating, it may be present but not operating, or it may not even be present or installed and thus obviously also not operating.

The light emitting arrangement is adapted for emitting electromagnetic radiation into the inner volume, wherein the light emitting arrangement is arranged to the combustion chamber such that an energy input to the pilot and/or the main flame is generated by the electromagnetic radiation for stabilizing the pilot and/or the main flame.

To be more precise, when the energy input is only directed to the main flame, then this configuration advantageously may stabilize the main flame. In this case pilot fuel may not even be required to generate a stable main flame. When the energy input is only directed to the pilot flame, then this configuration advantageously may stabilize the pilot flame. The stabilized pilot flame may then also improve the stabilization of the main flame. In a third configuration, when the energy input is directed to both pilot and main flame, then both flames may also be stabilized directly.

According to a further aspect of the present invention, a method of controlling a combustion system for a gas turbine is presented. According to the method, a main fuel is injected by a swirler into an inner volume of a pre-combustion section of a combustion chamber. The swirler device is mounted to the pre-combustion section which extends from an end section of the combustion chamber along a centre axis of the combustion chamber.

The main fuel is ignited such that a main flame is generated and burns inside the inner volume.

A pilot fuel—if the pilot burner device is present—is injected by or through a pilot burner device into the inner volume of the pre-combustion section, wherein the pilot burner device is mounted to an end section of the combustion chamber. The pilot fuel is ignited such that a pilot flame is generated and burns inside the inner volume.

The pilot flame is stabilized by emitting electromagnetic radiation from a light emitting arrangement into the inner volume such that an energy input to the pilot flame is generated.

As already indicated, a further embodiment of this design is that the stabilization function may be directed to the main flame. Thus, a laser is used to provide energy input to the main flame.

The combustion chamber may be an annular-type or a can-type combustor. The combustion chamber may be tubular and may have a cylindrical or an oval cross-section. The combustion chamber comprises a main combustion section and a pre-combustion section to which the swirler device is mounted.

Along a flow direction of the combustion gas inside the inner volume of the combustion chamber (which flow direction is generally parallel to the centre axis or the flow direction is in certain designs inclined to the centre axis), the pre-combustion section is located upstream with respect to the main combustion section. The main flame extends from the pre-combustion section to the downstream located main combustion section. The pilot flame—if the pilot burner device is installed—generally burns in the pre-combustion section and may extend only with a short section into the main combustion section. The pilot flame is used to stabilize the main flame.

The centre axis of the combustion chamber may be a symmetry line of the combustion chamber and in particular of the pre-combustion section. The centre axis of the combustion chamber may in another design coincide with the centre line of the gas turbine. At the swirler section, the swirler is mounted to the pre-combustion section and surrounds the pre-combustion section centre axis.

The end section is an upstream end section of the pre-combustion section and forms an upstream end section of the combustion chamber. In particular, the end section may comprise a normal which has a parallel component with respect to the center axis of the pre-combustion section. The end section may be defined as the section, where the pilot fuel enters the (pre-) combustion chamber. The end section may be formed e.g. by a tip end of a conically shaped combustion chamber or by a upstream end of a cylindrically shaped combustion chamber, for example.

The end section may also be an end face of the (pre-) combustion chamber and forms the upstream end section of the combustion chamber.

The swirler device comprises slots through which the main fuel consisting of an oxidant/fuel mixture is injectable by several swirler streams into the pre-combustion section. The swirler device may be in particular a radial swirler surrounding the pre-combustion section around the centre axis.

The oxidant/fuel mixture of the main fuel that flows through the slots of the swirler is directed generally tangentially with respect to the centre axis when entering within a respective stream into the pre-combustion section.

Furthermore, the oxidant/fuel mixture is directed inside the pre-combustion chamber with a component parallel to the axial direction of the centre axis inside the pre pre-combustion section until the oxidant/fuel mixture enters the main combustion section of the combustion chamber. The oxidant/fuel mixture of the main fuel generates the main flame.

A pilot burner device comprising a burner face may be attached to the end section close to the swirler device. A pilot fuel injector of the pilot burner device may be arranged to the pilot burner face for injecting pilot fuel into the pre-combustion section. The pilot fuel is injected generally along the axial direction of the centre axis of the pre-combustion chamber. Furthermore, the burner face may be located in particular within the end section of the pre-combustion section.

The pilot—if the pilot burner device is installed—is used for controlling the main flame in which the main fuel in burned. The injected pilot fuel generates a predefined flame shape generally inside the pre-combustion section. The main fuel stream is introduced via the swirler in a generally tangential direction into the combustor with respect to the centre axis of the combustor. The injected main fuel stream and the pilot fuel stream may comprise a liquid fuel or a gaseous fuel. The main fuel and the pilot fuel flow after being injected into the pre-combustion section generally along the centre axis to the main combustion section. The main fuel and the pilot fuel stream may also flow slightly inclined with respect to the centre axis. The pilot fuel is ignited in the pre-combustion section to form the pilot flame. The pilot flame ignites the main fuel for forming the main flame.

The oxidant may be for example air or compressed air. The fuel, which is injected by the swirler or the pilot burner, may be in a gaseous state, i.e. fuel gas, or in a liquid state, i.e. liquid fuel. The main fuel may be a lean oxidant/fuel mixture. The pilot fuel may be a rich oxidant/fuel mixture. Alternatively, the pilot burner may comprise separated fuel injectors and air injectors, so that the pilot fuel is a pure fuel and the oxidant is injected separately by the air injector.

In order to reduce the emissions, the main fuel comprises a very lean fuel/oxidant mixture. Hence, the temperature and the nitrogen oxides (NOx) and/or the carbon monoxides (CO) may be reduced. However, a lean mixture of the main fuel leads to a main flame which is unstable and which can cause undesired flame dynamics i.e. pressure fluctuations. As a first option, the main flame is stabilized according to the invention by using a light emitting arrangement, e.g. a laser directed into the main flame. As a second option, a pilot flame is generated in order to stabilize the main flame. Both options could also be combined or be implemented individually. The pilot fuel may be mixed with an oxidant such that a rich pilot fuel mixture is generated. This leads to a rich (most or all of the oxygen is consumed in the pilot flame during for combustion). Hence, the pilot flame is stable such that if the main flame is extinguished or nearly extinguished, the main flame may be re-ignited by the stable pilot flame. Hence, a stable combustion process in the combustion chamber is achieved.

The rich fuel air mixture of the pilot fuel leads also to higher emissions of the combustion chamber. Hence, it is an aim to reduce also the rich pilot fuel air mixture without generating an unstable combustion process in the combustion chamber. Therefore, by the present invention a light emitting arrangement is arranged to the combustion chamber and in particular to the pre-combustion section. The light emitting arrangement emits electromagnetic radiation into the inner volume of the combustion chamber, and specifically—when focusing now on the previously mentioned second option—into the region of the pilot flame, such that the light emitting arrangement provides an energy input to the pilot flame. If it is directed to the initial stages of combustion then the energy from the laser is imparted to the incoming air, specifically to the oxygen. This increase in energy levels of the air increases the production of the chemical composition OH in the early stages of the reaction which is normally deficient in this region. The rate of combustion is nominally set by the production of OH in the early stages of combustion, hence by increasing its production in this method the speed of combustion can be increased. This leads to increased stability.

The light emitting arrangement may be adapted to emit at least one light emitting radiation beam. Specifically, the light emitting arrangement may be a laser arrangement which is adapted to emit at least one laser beam or array of beams which is or are directed into the pilot and/or main flame (s) for imparting energy into the pilot and/or main flame (s). The light emitting arrangement may emit light emitting radiation beams, in particular laser beams, with a wavelength between approximately 300 nm to approximately 1500 nm.

Hence, by the electromagnetic radiation, energy is imparted into the pilot fuel air mixture and the pilot flame such that the reactivity of the fuel and the oxygen is increased, so that a more stable pilot flame is achieved. In particular, the energy of the electromagnetic radiation is imparted to the nitrogen in the air of the pilot flame. The nitrogen excites the oxygen in the air and hence increases the reactivity of the oxygen. This increases the reactivity with the fuel, so that a more stable pilot flame is achieved.

Moreover, the speed of the combustion between the fuel and the oxygen is increased also in the early stages of the combustion in the pre-combustion section. The electromagnetic radiation may be focused in the region of the pilot flame such that also the oxygen and in particular the air is imparted with energy such that a reactivity of the oxygen with the fuel is increased as well. The same principle can also be applied to the main flame with the laser control being used to stabilize the main flame in the place of a pilot flame. This could form part of an active control system where the energy input is increased or decreased based on measured combustion parameter to provide more or less stabilization as required to maintain the stability of the main flame.

Specifically, by the present approach of an embodiment of the invention, the electromagnetic radiation is focused in the region of the pilot flame. Hence, the fuel part of the pilot fuel air mixture—i.e. the pilot fuel/oxidant mixture—may be provided less rich and hence leaner, because the electromagnetic radiation keeps stabilizing the pilot flame, even with a less rich pilot fuel mixture. Hence, the less rich pilot fuel mixture leads to a reduced emission without destabilizing the pilot flame.

Furthermore, because the electromagnetic radiation may be focused in the pilot flame, the energy input may be concentrated to the pilot flame such that inefficient spreading of the energy input is reduced. Hence, by focusing the electromagnetic radiation to the pilot flame, also the energy conjunction of the light emitting arrangement itself may be reduced.

Summarizing, the use of the above-described light emitting arrangement leads to a stable combustion process inside the combustion chamber with reduced emissions, wherein also the energy consumption for the light emitting arrangement is reduced as well. Hence, a very effective combustion system with reduced emissions is provided.

According to a further exemplary embodiment of the present invention, the combustion chamber comprises a transparent section wherein the light emitting arrangement is arranged outside of the combustion chamber such that the electromagnetic radiation of the light emitting arrangement is emittable through the transparent section into the inner volume and in particular into the pilot flame. Hence, the transparent section is formed in such a way, that the wavelength of the electromagnetic radiation may pass through the transparent section almost without reducing the energy of the electromagnetic radiation. If the light emitting arrangement is mounted outside of the inner volume, wear and pollution due to the hot atmosphere in the inner volume may be prevented. Hence, the lifetime and the service intervals of the light emitting arrangement are reduced.

According to a further exemplary embodiment, the light emitting arrangement is mounted to the pre-combustion section. In particular, the light emitting arrangement may be arranged such that the electromagnetic radiation is emittable through the end section into the inner volume, but not exclusively limited to the end section of a burner. The pilot flame extends generally from the end section along a downstream direction and in particular along the centre axis. The pilot fuel may flow parallel or inclined with respect to the centre axis. Hence, if the electromagnetic radiation is emitted through the end section into the inner volume, the electromagnetic radiation almost exclusively runs through the pilot flame such that the energy of the electromagnetic radiation is impartable into the pilot flame very efficiently. Particularly, the light emitting arrangement may be mounted to the pilot burner device, or via other appropriate means.

According to a further exemplary embodiment, the light emitting arrangement comprises a fibre optic and a fibre exit assembly which is coupled to the fibre. The fibre exit assembly is mounted to the combustion chamber such that the light emitting radiation beam, e.g. the laser beam, is emittable from the fibre exit assembly into the inner volume.

The fibre exit assembly may convert the light which exits the fibre optic to the electromagnetic radiation beam which is focused into the pilot flame. The fibre exit assembly of the light emitting arrangement may be mounted to the pilot burner device. The fibre optic connects the fibre exit assembly with a light emitting source, such as a light emitting source, which may be arranged spaced apart from the combustion chamber.

Hence, in an exemplary embodiment, the light emitting arrangement further comprises a light emitting source, e.g. a laser source, which is arranged spaced apart from the combustion chamber, wherein the light emitting source is adapted for emitting electromagnetic radiation, e.g. laser beams, into the fibre optic. Hence, if the light emitting source is arranged spaced apart from the combustion chamber, the light emitting source which comprises sensitive technical equipment is not exposed to the hot temperature of the combustion process in the combustion chamber. Hence, the lifetime of the light emitting arrangement and in particular of the light emitting source may be increased.

According to a further exemplary embodiment, the light emitting arrangement comprises a plurality of laser emitters for emitting a plurality of electromagnetic radiation beams.

According to a further exemplary embodiment, the light emitting arrangement comprises a control unit for controlling at least one parameter of the electromagnetic radiation. The parameters may be the intensity of the electromagnetic radiation, the focus of the electromagnetic radiation, the pattern of the plurality of electromagnetic radiation beams and/or the time varying of the (e.g. pulsed) electromagnetic radiation beams. The electromagnetic radiation may be emitted continuously or pulsed.

Hence, by the control device, the energy input of the electromagnetic radiation may be controlled very efficiently. For example, under a maximum power of the gas turbine, a huge amount of main fuel and pilot fuel is injected into the combustion chamber for generating a maximum power. Under this working condition, the main flame is very stable, such that a lower energy input by the light emitting arrangement is needed for stabilizing the main flame. Hence, e.g. the intensity, the focus or the time variation of the electromagnetic radiation may be simply controlled by the control device. Hence, the light emitting arrangement and the overall combustion system may be operated very energy-saving and very efficient.

According to a further exemplary embodiment, the light emitting arrangement comprises an optical imaging device. The optical imaging device is arranged in such a way that the electromagnetic radiation comprises a focus section which is focuses emitted light in the pilot flame and/or the main flame inside the inner volume. Hence, e.g. in a region between the pilot flame and the light emitting source, the electromagnetic radiation may be less focused and in a more scattered condition while at the pilot flame, the electromagnetic radiation is focused by the optical imaging device such that the energy input at the point of interest, namely at the pilot flame, is increased. Hence, the electromagnetic radiation may be directed to the pilot flame more efficient by the use of the optical imaging device. The same configuration can also be used for the main flame.

Therefore, the optical imaging device may comprise one or a plurality of lenses, for example.

By the present invention, the pilot fuel mixture may be provided leaner or even completely removed in comparison to conventional approaches. By the use of the light emitting arrangement, the pilot fuel injection may also be reduced and in more stable working conditions of the gas turbine, the pilot fuel injection may be reduced to a minimum. Under certain working conditions, the combustion system may work without injecting a pilot fuel through the pilot burner device while only the light emitting arrangement provides an electromagnetic radiation which is focused inside the inner volume.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
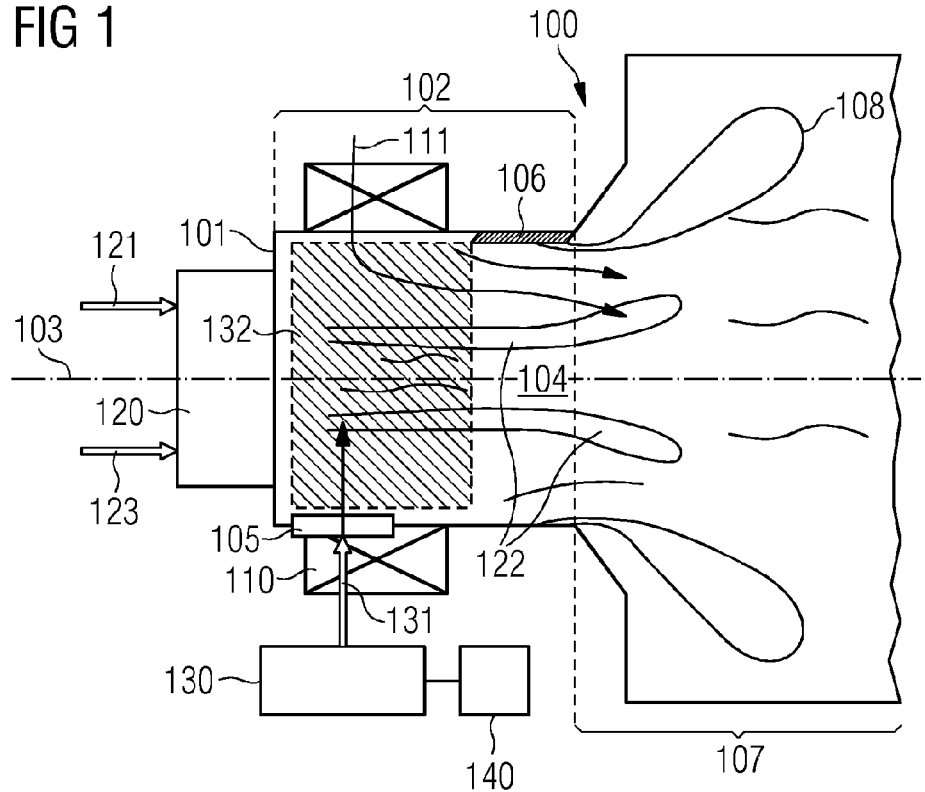
FIG. 1 shows an exemplary embodiment of the combustion system according to an exemplary embodiment of the present invention, wherein the electromagnetic radiation is running through a sidewall of the pre-combustion section.

The illustrations in the drawings are schematic, although depicting a parallel configuration they may also be considered representative of specific product designs and definitions where the combustion chambers are inclined to the centre line axis of the turbine. It is noted that in different figures similar or identical elements are provided with the same reference signs.

All the following examples will show embodiments, in which light will be focused in the pilot flame region. Nevertheless the configurations may be adapted to focus in the main flame region.

FIG. 1 shows a combustion system for a gas turbine engine. The combustion system comprises a combustion chamber 100. The combustion chamber 100 has an end section 101, a pre-combustion section 102 extending from the end section 101 along a centre axis 103 of the combustion chamber 100 and a main combustion section 107 which extends from the pre-combustion section 102 along the centre axis 103. The end section 101 forms an upstream end of the tubular combustion chamber 100.

Furthermore, a swirler device 110 is mounted to the pre-combustion section 102 such that a main fuel 111 is injectable by the swirler device 110 into an inner volume 104 of the pre-combustion section 102. A main flame 108 is burned by the main fuel inside the inner volume 104.

Furthermore, in this configuration a pilot burner device 120 is mounted to the end section 101 of the combustion chamber 100, such that a pilot fuel is injectable by or through the pilot burner device 120 into the inner volume 104 of the pre-combustion section 102. A pilot flame 122 is flammable inside the inner volume 104 for stabilizing the main flame 108.

Furthermore, a light emitting arrangement 130 for emitting an electromagnetic radiation 131 into the inner volume 104 is arranged to the combustion chamber 100. The light emitting arrangement 130 is arranged to the combustion chamber 100 such that an energy input to the pilot flame 122 is generatable by the electromagnetic radiation 131 for stabilizing the pilot flame 122.

FIG. 1 shows the combustion chamber 100, which may be a can-type combustion chamber, for example. The combustion chamber may comprise a tubular shape which comprises the centre axis 103. The pre-combustion section 102 may comprise a smaller diameter than the main combustion section 107.

The swirler device 110 may be mounted to the pre-combustion section 102 such that the swirler device 110 surrounds the pre-combustion section 102 around the centre axis 103. The main fuel 111 may be injected generally along a radial direction with respect to the centre axis 103. The main fuel 111 may stream inside the inner volume 104 along a downstream direction into the main combustion section 107.

Furthermore, the pilot burner device 120 is schematically shown. The pilot burner device 120 may comprise a pilot fuel inlet for injecting pilot fuel 121 or a pilot fuel mixture comprising fuel and an oxidant, such as air. Furthermore, the pilot burner 120 may comprise a separate oxygen inlet for injecting oxygen 123. In the inner volume 104, the injected pilot fuel is flammable and forms the pilot flame 122. The pilot flame 122 flames the main fuel which forms the main flame 108.

The pilot fuel mixture is a rich fuel/oxidant mixture and thus very stable. The main fuel is a lean main fuel/oxidant mixture such that the main flame 108 is unstable but provides fewer emissions.

In order to stabilize the pilot flame 122, the light emitting arrangement 130 emits an electromagnetic radiation 131 into an energy input region 132 inside the inner volume 104 of the pre-combustion section 102. The electromagnetic radiation 131 excites for example the nitrogen and/or the oxygen in the air inside the energy input region 132, such that the reactivity of the oxygen is increased. Hence, the higher reactivity of the oxygen leads to a better burning of the pilot fuel 121 and hence of the main fuel 111.

Please note that the energy input region 132 is only schematically indicated as a cylindrical area. It may be advantageous to directly focus the radiation into the pilot flame 122. Then, the energy input region 132 may have the form of an annulus.

In FIG. 1, the light emitting arrangement 130 is arranged with respect to the pre-combustion section 102 in such a way that the electromagnetic radiation 131 may run along a radial direction with respect to the centre axis 103 into the energy input region 132. The sidewall of the pre-combustion section 102 may comprise a window, i.e. a transparent section 105, through which the electromagnetic radiation 131 may run without being filtered or blocked. Alternatively, the light emitting arrangement 130 may also be arranged inside the inner volume 104.

The light emitting arrangement 130 may be controlled by a control unit 140 for controlling at least one parameter of the electromagnetic radiation 131, e.g. of the laser beams. In particular, the intensity, the focus, the pattern of the plurality of electromagnetic radiation 131 and the time varying, e.g. of a pulse electromagnetic radiation 131, may be controlled by the control device 140.

Furthermore, as can be taken from FIG. 1, a reflecting element 106, such as minors, may be arranged inside the inner volume 104, such that the electromagnetic radiation 131 may be reflected so that the energy input by the electromagnetic radiation 131 may be increased.

Alternatively, not shown, there may be a configuration without a pilot burner device 120. Or there may be a configuration with a pilot burner device 120 but pilot fuel is switched off. The light emitting arrangement 130 for emitting an electromagnetic radiation 131 may emit its radiation then into or near the main flame 108. This configuration is advantageous as it allows stabilizing the main flame 108 directly without having a pilot flame 122.

Figure 2:
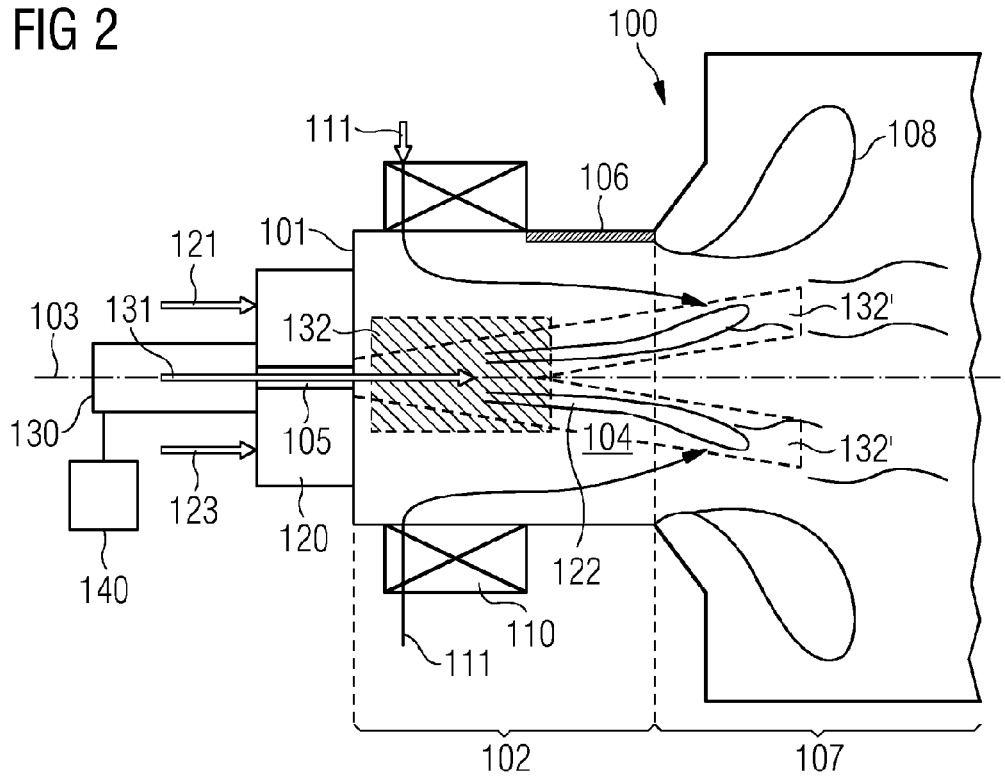
FIG. 2 shows a schematical view of a combustion system according to an exemplary embodiment of the present invention, wherein the electromagnetic radiation is injected through an end section.

FIG. 2 shows a combustion system according to an exemplary embodiment of the present invention. The combustion system shown in FIG. 2 comprises similar features as the combustion system shown in FIG. 1.

Alternatively to FIG. 1, the light emitting arrangement 130 may be arranged and mounted to the end section 101 and/or to the pilot burner device 120, such that the electromagnetic radiation 131 may run from the end section 101 into the energy input region 132 of the inner volume 104.

Therefore, the pilot burner device 120 may comprise the transparent section 105, such that the electromagnetic radiation 103 may run generally along the centre axis 103 into the energy input region 132.

It may be beneficial when the electromagnetic radiation 131 is not emitted right at the centre axis 103 but with an offset or inclined in an angle. This may particularly be advantageous for the illustrated pilot flame 122 and with its corresponding energy input region 132', which covers the actual region of the pilot flame 122.

Thus it must be understood that the precise configuration must be aligned with the given flame behaviour of the given burner. But in general it may be one embodiment to have the light emitting arrangement 130 at the front face of the burner (see FIG. 2) or to have it in another embodiment at a side face of the combustor (See FIG. 1).

Figure 3:
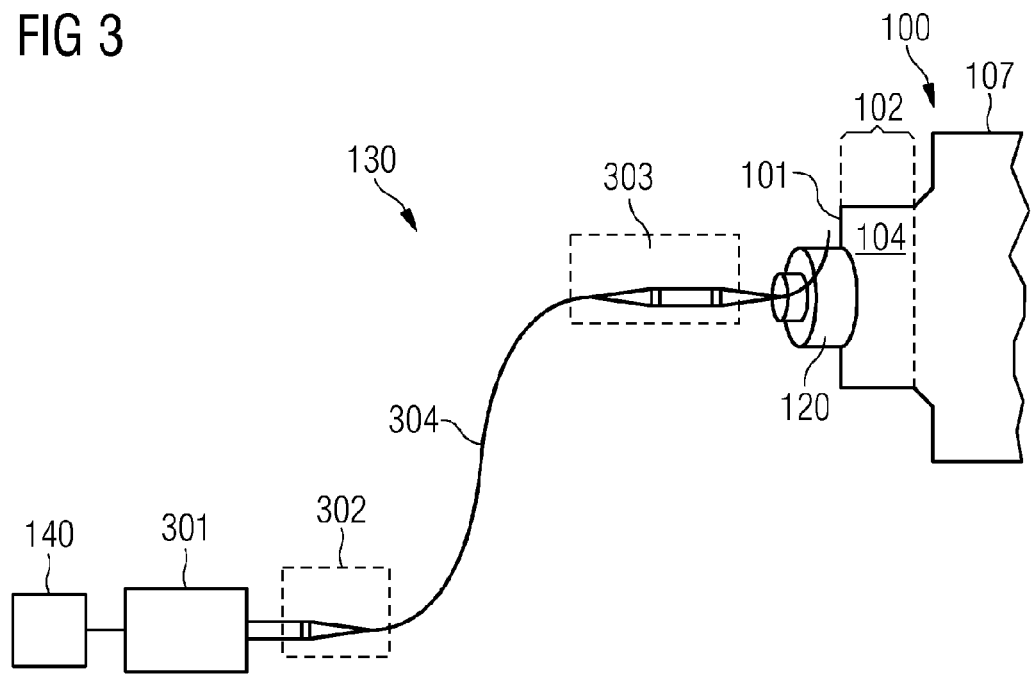
FIG. 3 shows a schematical view of the combustion system, wherein the light emitting arrangement comprises a fibre optic according to an exemplary embodiment of the present invention.

FIG. 3 shows a combustion system according to an exemplary embodiment of the present invention, wherein the light emitting arrangement 130 is shown in more detail. The light emitting arrangement 130 comprises a light emitting source 301 which is spaced apart from the combustion chamber 100 and in particular from the pre-combustion section 102 and the main combustion section 107.

A fibre exit assembly 303 may be attached to the pilot burner device 120 for injecting the electromagnetic radiation 131, e.g. laser beams, into the inner volume 104. The fibre exit assembly 303 is connected by a fibre optic 304 to a fibre input assembly 302. The light emitting source 301 (e.g. the laser source) may emit the electromagnetic radiation 131 (e.g. laser beams) to the fibre input assembly 302 which provides the electromagnetic radiation (e.g. the laser beams) into the fibre optic 304. The fibre input assembly 302 may comprise lens systems and is adapted for preparing the emitted electromagnetic radiation from the light source 301 for transportation through the fibre optics 304. The fibre exit assembly 303 may comprise further lens systems for generating a desired electromagnetic radiation beam which is emitted into the inner volume 104 from the electromagnetic radiation provided by the fibre optic 304. Hence, by the exemplary embodiment shown in FIG. 3, the light emitting source 301 may be arranged spaced apart to the combustion chamber 100.

Figure 4:
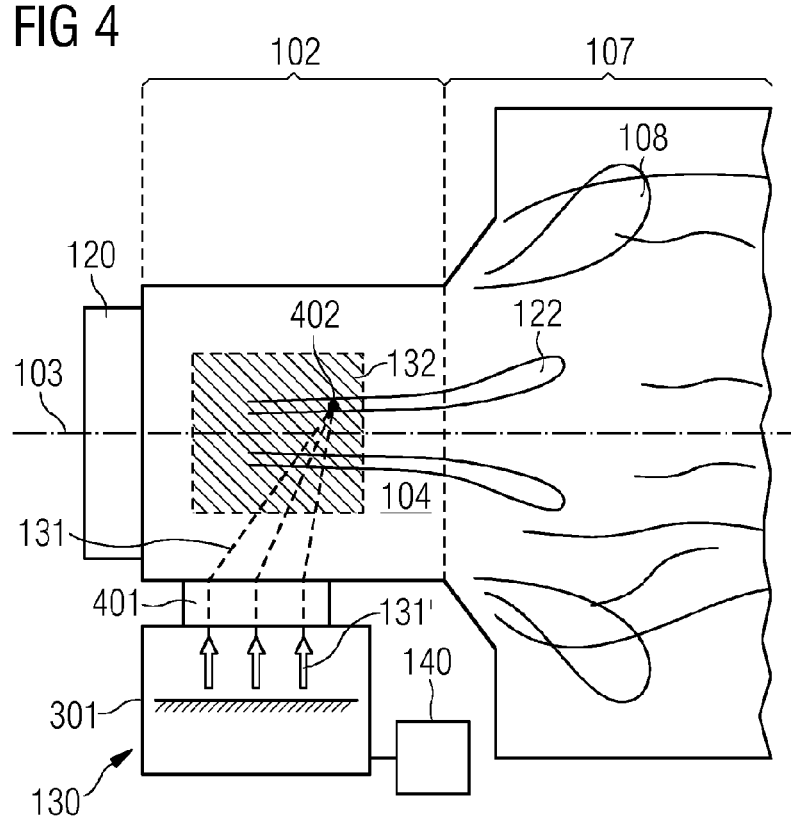
FIG. 4 shows a schematical view of the combustion chamber, wherein the light emitting arrangement comprises an optical imaging device according to an exemplary embodiment of the present invention.

FIG. 4 shows an exemplary embodiment of the combustion system with similar features shown in the FIG. 1 to FIG. 3 above.

Additionally, an optical imaging device 401 is shown. The optical imaging device 401 may be interposed between the light emitting source 301 of the light emitting arrangement 130 and the energy input region 132. The optical imaging device 401 may comprise a lens system, such that the electromagnetic radiation 131 may be focused such that a desired focus section of the electromagnetic radiation 131 is locatable in the pilot flame 122 and hence in the energy input region 132. Hence, the energy input may be optimized and controlled.

The light emitting source 301 may emit a plurality of parallel electromagnetic radiation beams 131' (e.g. parallel laser beams) which may be focused by the optical imaging device 401. The optical imaging device 401 may focus the electromagnetic radiation beams 131 such that a focus 402 of the electromagnetic radiation 131 is generated in a centre of the energy input region 132.

According to the invention the light emitting arrangement 130 emits an electromagnetic radiation 131 into the inner volume 104, wherein the light emitting arrangement 130 is arranged to the combustion chamber 100 such that an energy input to the pilot flame 122 and/or the main flame 108 is generatable by the electromagnetic radiation 131 for stabilizing the pilot flame 122 and/or the main flame 108, particularly to reduce the fuel required by the pilot flame and hence the emissions. The light emitting arrangement could also be used—even though not explicitly shown in the figures but as indicated in the previous text—to replace the function of the pilot flame and be used to stabilise the main flame instead of using a pilot flame.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A combustion system for a gas turbine, the combustion system comprising
    a combustion chamber having an end section and a pre-combustion section extending from the end section along a centre axis of the combustion chamber,
    a swirler device which is mounted to the pre-combustion section such that a main fuel is injectable by the swirler device into an inner volume of the pre-combustion section,
    wherein a main flame using the main fuel is producible inside the inner volume,
    a pilot burner device which is mounted to the end section of the combustion chamber such that a pilot fuel is injectable by or through the pilot burner device into the inner volume of the pre-combustion section, wherein a pilot flame using the pilot fuel and comprising a pilot flame shape is producible inside the inner volume for stabilizing the main flame,
    a light emitting arrangement for emitting electromagnetic radiation into an energy input region in the inner volume, wherein the light emitting arrangement is arranged to the combustion chamber such that an energy input to the pilot flame and/or the main flame is generatable by the electromagnetic radiation for stabilizing the pilot flame and/or the main flame, and
    a control unit configured to control the light emitting arrangement so that the energy input region defined by the light emitting arrangement subsumes the pilot flame.

2. The combustion system according to claim 1, wherein the combustion chamber further comprises a transparent section, wherein the light emitting arrangement is arranged outside of the combustion chamber such that the electromagnetic radiation of the light emitting arrangement is emittable through the transparent section into the inner volume.

3. The combustion system according to claim 1, wherein the light emitting arrangement is mounted to the pre-combustion section.

4. The combustion system according to claim 1, wherein the light emitting arrangement is arranged such that the electromagnetic radiation is emittable through the end section into the inner volume.

5. The combustion system according to claim 4, wherein the light emitting arrangement is mounted to the pilot burner device.

6. The combustion system according to claim 1, wherein the light emitting arrangement comprises a fibre optic and a fibre exit assembly which is coupled to the fibre optic, and
    wherein the fibre exit assembly is mounted to the combustion chamber such that the electromagnetic radiation is emittable from the fibre exit assembly into the inner volume.

7. The combustion system according to claim 6, wherein the light emitting arrangement further comprises a light emitting source which is arranged spaced apart from the combustion chamber,
    wherein the light emitting source is adapted for emitting the electromagnetic radiation into the fibre optic.

8. The combustion system according to claim 1, wherein the light emitting arrangement further comprises a plurality of electromagnetic radiation emitters for emitting a plurality of electromagnetic radiation beams.

9. The combustion system according to claim 1, wherein the control unit controls at least one additional parameter of the electromagnetic radiation.

10. The combustion system according to claim 1, wherein the light emitting arrangement further comprises an optical imaging device,
    wherein the optical imaging device is arranged in such a way that the electromagnetic radiation comprises a focus section which focuses emitted light in the pilot flame and/or the main flame inside the inner volume.

11. The combustion system according to claim 1, wherein the light emitting arrangement comprises a laser arrangement for emitting the electromagnetic radiation comprising laser beams.

12. The combustion system according to claim 1, wherein a shape of the energy input region comprises an annulus centered around the centre axis of the combustion chamber.

13. The combustion system according to claim 12, wherein the annulus diverges with increasing distance from the end section.

14. The combustion system according to claim 1, wherein the pilot flame shape comprises an annular shape, wherein the energy input region comprises an annular shape, and wherein the energy input region is configured to align with and fully cover the pilot flame.

15. The combustion system according to claim 1, wherein the pilot flame shape comprises an annular shape that diverges from the end section toward the combustion chamber, wherein the energy input region comprises an annular shape that diverges toward from the end section toward the combustion chamber, and wherein the energy input region is configured to align with and fully cover the pilot flame.

16. The combustion system according to claim 1, wherein the energy input region extends from the pre-combustion section into the combustion chamber.

17. A method of controlling a combustion system for a gas turbine, the method comprising
- injecting a main fuel by a swirler device into an inner volume of a pre-combustion section of a combustion chamber, wherein the swirler device is mounted to the pre-combustion section which extends from an end section of the combustion chamber along a centre axis of the combustion chamber,
- burning the main fuel such that a main flame is generated inside the inner volume,
- injecting a pilot fuel by or through a pilot burner device into the inner volume of the pre-combustion section, wherein the pilot burner device is mounted to the end section of the combustion chamber,
- burning the pilot fuel such that a pilot flame comprising a pilot flame shape is generated inside the inner volume,
- stabilizing the pilot flame and/or the main flame by emitting electromagnetic radiation from a light emitting arrangement into an energy input region of the inner volume such that an energy input to the pilot flame is generated, and
- defining the energy input region via the light emitting arrangement so that the pilot flame fits entirely within the energy input region.

18. The method of claim 17, wherein the pilot flame shape and a shape of the energy input region both comprise an annulus, each annulus centered around the centre axis of the combustion chamber.

19. The method of claim 18, wherein the annulus diverges with increasing distance from the end section.

20. The method of claim 17, further comprising defining the energy input region so that the energy input region extends from the pre-combustion section into the combustion chamber.

* * * * *